W. LEWIN.
TAXIMETER.
APPLICATION FILED JULY 31, 1911.

1,084,018.

Patented Jan. 13, 1914.

WITNESSES

INVENTOR
WALTER LEWIN
BY
ATTORNEYS

W. LEWIN.
TAXIMETER.
APPLICATION FILED JULY 31, 1911.

1,084,018.

Patented Jan. 13, 1914.
7 SHEETS—SHEET 3.

WITNESSES
H.J. Pint.
P.S. Pidwell

INVENTOR
WALTER LEWIN
BY
Miller & White
ATTORNEYS

W. LEWIN.
TAXIMETER.
APPLICATION FILED JULY 31, 1911.

1,084,018.

Patented Jan. 13, 1914.
7 SHEETS—SHEET 4.

Fig. 6    Fig. 7

WITNESSES
H.Y. Pint.
P.S. Pidwell

INVENTOR
WALTER LEWIN
BY Miller & White
ATTORNEYS

W. LEWIN.
TAXIMETER.
APPLICATION FILED JULY 31, 1911.

1,084,018.

Patented Jan. 13, 1914.
7 SHEETS—SHEET 5.

Fig. 8

WITNESSES
H. J. Prat.
P. S. Pidwell

INVENTOR
WALTER LEWIN
BY
Miller & White
ATTORNEYS

W. LEWIN.
TAXIMETER.
APPLICATION FILED JULY 31, 1911.

1,084,018.

Patented Jan. 13, 1914.

WITNESSES
H.J. Prat.
P.S. Pidwell

INVENTOR
WALTER LEWIN
BY Miller & White
ATTORNEYS

W. LEWIN.
TAXIMETER.
APPLICATION FILED JULY 31, 1911.

1,084,018.

Patented Jan. 13, 1914.
7 SHEETS—SHEET 7.

WITNESSES
H. G. Pratt.
P. S. Pidwell

INVENTOR
WALTER LEWIN
BY Miller & White
ATTORNEYS

UNITED STATES PATENT OFFICE.

WALTER LEWIN, OF ABERDEEN, WASHINGTON.

TAXIMETER.

1,084,018.   Specification of Letters Patent.   Patented Jan. 13, 1914.

Application filed July 31, 1911. Serial No. 641,636.

*To all whom it may concern:*

Be it known that I, WALTER LEWIN, a subject of Great Britain, and a resident of the city of Aberdeen, Chehalis county, State of Washington, have invented certain new and useful Improvements in Taximeters, of which the following is a specification.

The invention relates to taximeters for use on automobiles and other vehicles to register and record the distance traveled, the cost of the trip and other items which may be necessary or desirable on such record.

The object of the invention is to provide a taximeter which will produce duplicate records of the various items, one of which records is retained in the device and the other delivered to the passenger.

Another object of the invention is to produce duplicate printed records of the distance traveled, the cost of the trip, the time consumed for the trip and other markings to identify the vehicle and driver and date of the trip.

Another object of the invention is to provide a taximeter which will register and record the cost of the trip at different rates or schedules, depending on the number of passengers carried or other circumstances of travel.

A further object of the invention is to provide a taximeter which when attached to a vehicle which is hired at a certain rate per mile traveled will automatically register at another rate during that period of the trip when the vehicle is at rest.

This device possesses other advantageous features, which, with the foregoing will be set forth at length in the following description, where I shall outline in full that form of embodiment of the invention which I have selected for illustration in the drawings accompanying and forming part of the present specification. The novelty of the invention will be included in the claims succeeding said description. From this it will be apparent that I do not restrict myself to the showing made by such drawings and descriptions as I may adopt many variations within the scope of my invention, as expressed in said claims.

Heretofore, as far as I am aware, taximeters have registered only on dials, the distance traveled and the cost of the trip and no provision has been made for supplying the passenger with a record or receipt showing the distance traveled and the cost of the trip or other items concerning the conditions of the trip or identifying marks showing the vehicle and driver's number and the time consumed. This arrangement has proved objectionable in many respects, as a dispute often arises between the driver and the passenger as to the correctness of the fare. When a record slip is furnished the passenger, all disputes may be carried to the office of the company operating the vehicle and such dispute may be readily settled by the company.

A further advantage of the device is that it supplies the company with a duplicate of the slip furnished the passenger, so that the company has a complete record of all trips, their length and duration, and the cost thereof.

Other advantages of the device will become apparent as the device is described in detail.

In the present device, I have provided means for registering and recording at four different rates or schedules, which have generally been found sufficient, but the number of rates may be varied when desirable, as may also the rates themselves. The four rates employed in the present embodiment of the device are single tariff, double tariff, $3.50 per hour and $4.00 per hour.

The charge for service under the first two rates depends upon the number of passengers carried and under the last two rates upon the duration of the trip or other conditions which may enter into the arrangement. The rate under which the meter is operating is displayed to the passenger at all times. When the vehicle is not in service, the notice "Vacant" appears on the face of the meter and under such conditions the computing or integrating mechanism is thrown out of operation, so that the mechanism which registers the cost of the trip is thrown out of operation. During this time, however, the odometer, or distance recorder is in operative relation, so that any movement of the vehicle is apparent from the record tape.

Referring to the drawings.

The device is inclosed in a suitable casing 2, which is provided with a base, 3, for supporting it upon a bracket or other similar structure. The integrating and registering mechanisms are supported on a suitable frame composed preferably of the plates 4—5, secured together in any suitable manner. This frame is generally secured within the casing and remains permanently therein. The tape feeding and stamping mechanism is mounted on a plate 6 which is provided with dowel pins 7 which engage female dowels 8 on the frame, when the plate 6 is in position. This plate 6, carrying the record tapes is arranged to be readily removable from the casing, so that access may be had to the tape reels.

Figure 1:
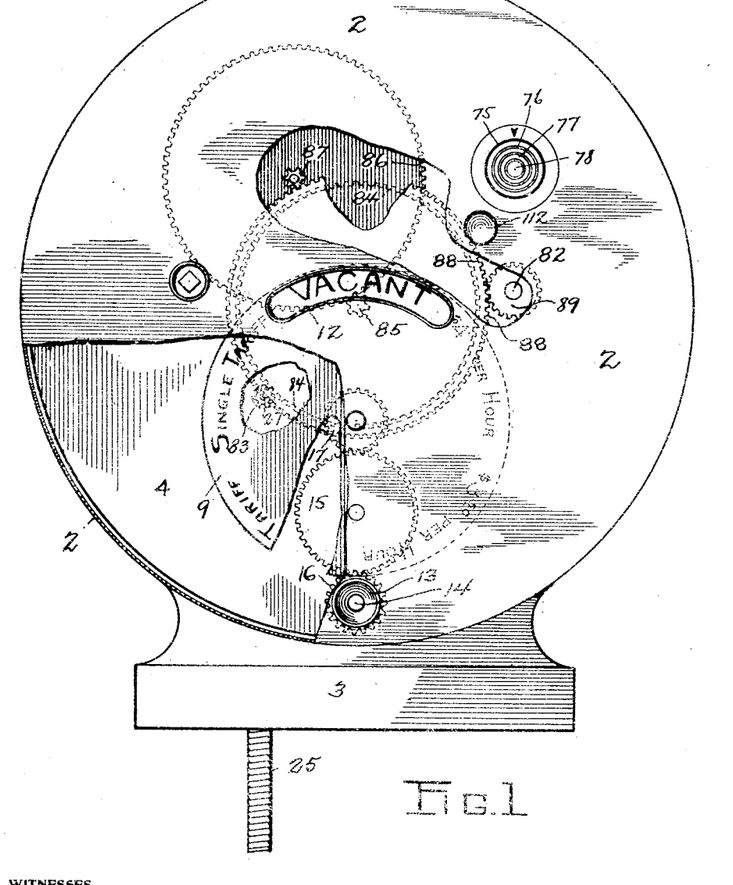
Figure 1 is a front view of the meter, several of the parts being broken away to show the tariff wheel and the odometer gears.

Arranged behind the front face of the casing 2, is the tariff wheel 9, upon which is printed or delineated the designations of the various tariffs. The casing is provided with an aperture 12, at which the tariff for which the meter is set is visible. The tariff wheel is rotated to its proper position by means of the thumb wheel 13 mounted on the shaft 14, which extends to the outside of the casing. An idler gear 15, meshing with gear 16 on shaft 14 and with gear 17 on the tariff wheel shaft transfers the motion from shaft 14 to the tariff wheel. Arranged on the casing behind the thumb wheel 13 is a spring held button 18 which engages depressions on the thumb-wheel when the tariff wheel is revolved and serves to stop the tariff wheel at the proper point for any particular tariff and holds the tariff wheel in such position.

Within the meter are four sets of mechanisms, corresponding to the four tariffs and each adapted to integrate the time or distance in the proper relation. These mechanisms are arranged to be thrown into or out of operative relation with the recording means, according to the conditions under which the vehicle is operating. When the designation "Vacant" appears on the face of the meter all of these mechanisms are out of working relation, so that a movement of the vehicle will not cause a recording of the cost. When either of the four tariffs is shown on the face of the meter, the mechanism corresponding to that tariff is in operation to record the cost of the trip.

Figure 6:
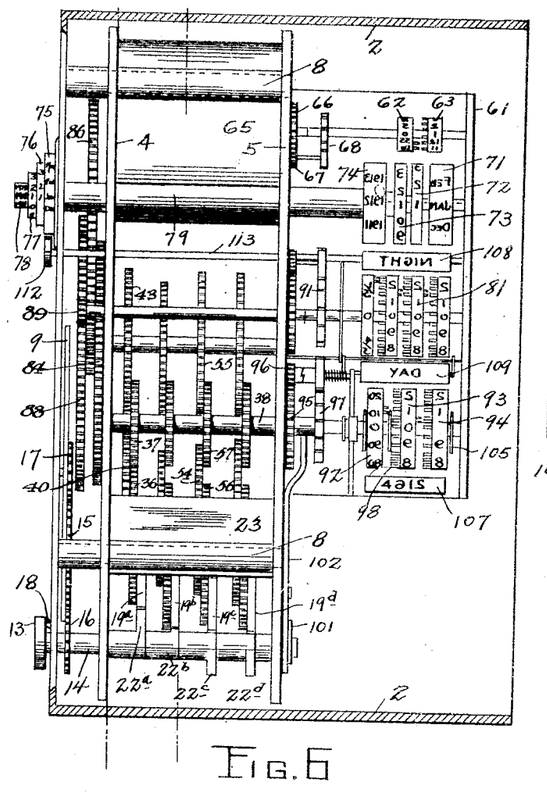
Fig. 6 is a side view of the meter, part of the casing being broken away, showing the integrating and registering mechanism of the four schedules.

Each of the mechanisms corresponding to the tariffs is mounted on the arms $19^a$— $19^b$— $19^c$— $19^d$— which are pivoted to the shaft 21. When either of these arms is lifted or partially rotated about the shaft 21, the various mechanisms thereon are brought into operative relation with the driving and recording mechanisms and the cost of the trip is recorded. These arms $19^a$— $19^b$— $19^c$— $19^d$— are moved respectively by the cams $22^a$— $22^b$— $22^c$— $22^d$— mounted on the shaft 14, and are spaced apart according to the corresponding designations on the tariff wheel. The cam corresponding to a particular tariff operates to throw that mechanism into operation when that particular tariff is shown on the face of the meter. The arms $19^a$— $19^b$— $19^c$— $19^d$— are preferably arranged in a substantially horizontal position, so that those which are not acted on by the cams, drop out of operative engagement by means of gravity but a spring may be employed when desirable. When the designation "Vacant" appears on the meter neither of the cams are operative and all of the cost recording mechanisms are out of operation.

The arms are held in proper position, so that when moved upward the mechanisms thereon will properly engage, by means of a slotted guide member 23, secured to the frame and in which the outer ends of the arms slide. In order to insure the proper engagement of the mechanisms on the arm with the fixed mechanisms of the meter, a flat spring member 24 is provided on the arm, against which the cam bears. This allows the arm to possess a certain resiliency when the various mechanisms are being brought together and prevents a jamming of the gear teeth.

As the meter comprises two classes of integrating mechanisms, one for the distance schedules and one for the time schedules, I will describe each mechanism separately. The distance mechanism is operative by the motion of the vehicle, but provision is also made for recording the charge when the vehicle is not moving, when chartered under the distance schedules. When the meter is operating on one of the time schedules the distance traveled does not effect the money charge.

Figures 2, 3:
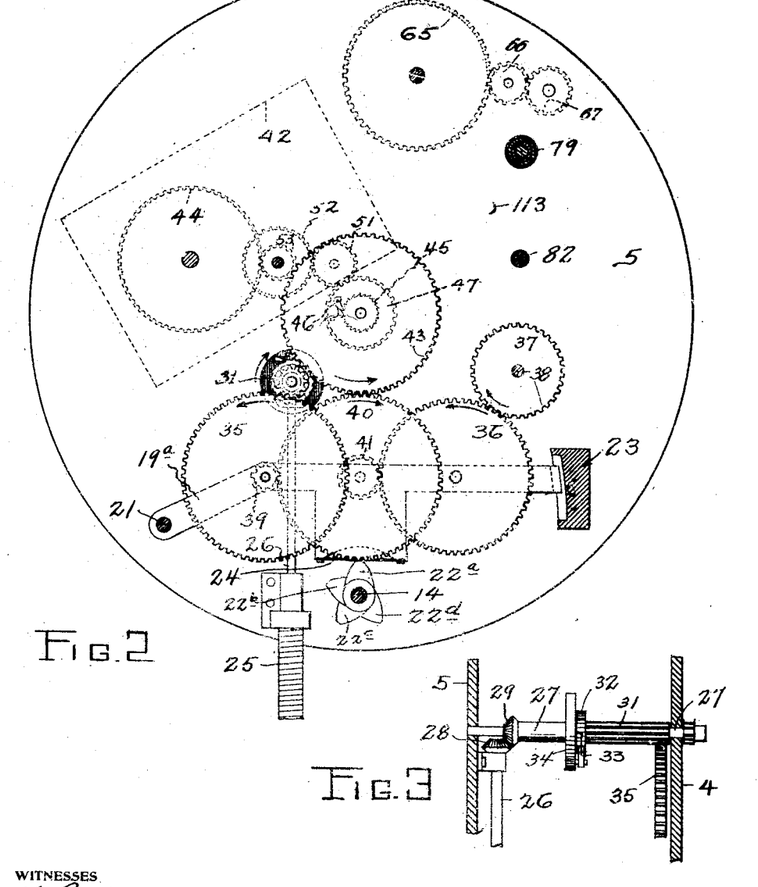
Fig. 2 is a section through the meter showing the distance integrating mechanism in coöperative relation with the driving gear and the money registering mechanism.
Fig. 3 is a detail of the drive shaft and main shaft connections.

*The distance integrating mechanism.*—The meter is connected to a moving part of the vehicle, preferably a wheel hub, by the flexible shaft 25 which extends into the meter and is attached to the shaft 26, which I have designated the drive shaft. The drive shaft 26 is connected to the shaft 27 by means of the bevel gears 28—29. Loosely mounted on shaft 27 is the gear 31 which is provided on one end with a ratchet 32. This ratchet is engaged by a pawl 33 mounted on a collar 34 on shaft 27, so that gear 31 is revolved only when the shaft 27 is revolving in one direction. This prevents the backing of the vehicle from injuring the mechanism. When the arm 19ª— is raised, gear 35 is brought into mesh with gear 31 and gear 36 is brought into mesh with gear 37 on the money wheel shaft 38. Motion is transferred from gear 31, through gears 35—39—40—41 and 36 to gear 37, which operates the recording mechanism. These gears are so proportioned that the charge for distance traveled is in accordance with the schedule. When the vehicle is at rest however, during the time of its charter, provision must be made for charging for and recording the cost of such time. This is accomplished by means of a clock mechanism 42. When the arm 19ª is moved into position the gear 40 engages a gear 43 which is connected to the main clock drive gear 44 by suitable gearing. Mounted on the shaft carrying gear 43 is a ratchet 45 which is engaged by a pawl 46 on gear 47, loosely mounted on the same shaft. Gear 47 is connected to the clock gear 44 by the idlers 51, 52 and 53. It is apparent that when the vehicle is moving, the speed of gear 43 and therefore of ratchet 45 will be greater than the speed imparted to gear 47 by the clock. The ratchet therefore allows this action without effecting the clock, but when the vehicle stops gear 47 drives the recording means through the ratchet. Under the conditions when the recording apparatus is being driven by the clock, the ratchet 32 on gear 31, allows such gear to revolve with effecting the driving shaft 26. The proportionate sizes of the various gears in the mechanism are arranged to indicate on the money wheels, the proper charge for the service, according to the schedule charged. These sizes have all been calculated for the schedules shown, herein but as they vary for different size of vehicle wheels and different tariffs, the exact sizes of the gears will not be given. They can readily be determined however by persons skilled in the art.

Figures 4, 5:
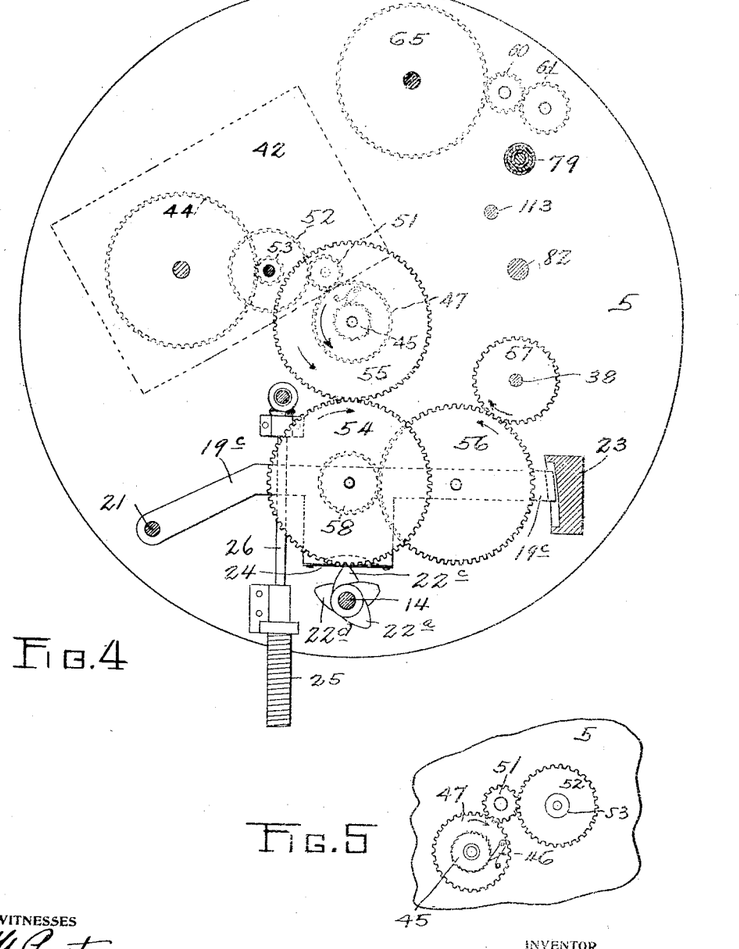
Fig. 4 is a section through the meter showing the time integrating mechanism in mesh with the money registering mechanism.
Fig. 5 is a detail of part of the mechanism between the clock mechanism and the time integrating mechanism.

*The time integrating mechanism.*—The time integrating mechanism is thrown into operation when the vehicle is chartered at either of the time schedules, which in the present instance are $3.50 and $4.00 per hour. I will assume that arm 19ᶜ— carries the integrating mechanism for the $3.50 per hour schedule. When this arm is thrown into operative relation gear 54 thereon engages with gear 55 which is on the same shaft as gear 43, and gear 56 meshes with gear 57 on shaft 38. The gears on shaft 38 are preferably all of the same size but this is not absolutely necessary. Motion is transferred from the clock gear 44, through gears 53—52—51—47—55—54—58—56 and 57 to shaft 38. The gears 55—54—58 and 56 are so proportioned that the amount of money registered on the money wheels is proportionate to the elapsed time and the rate of charge. For the $4.00 per hour rate the size of these gears vary, although their operation is the same.

*The registering mechanism.*—Provision is made for registering and recording the time duration of the trip, the number of miles traveled, the cost of the trip, the date on which the trip was taken, the driver of the vehicle and the number of the vehicle. This presents a record which is complete and enables the passenger and the company to obtain an exact record of this data. The data is obtained on printing wheels and stamps and is recorded on duplicate tapes, one of which is retained in the meter and the other of which is presented to the passenger. The various printing wheels and stamps are arranged in proper alinement so that they all print upon the tapes at the desired time. The various wheels and stamps are supported on shafts bearing in the frame and in the bracket 61, which lies back of the integrating mechanism. The time is indicated by the printing wheels 62—63 mounted on the shaft. These wheels are operated from the clock 65, through the gears 66—67 and the Geneva gear 68, the object of the Geneva gear being to cause the printing wheel to move rapidly from one step to the next. The wheels 62—63 are provided with laterally extending pins which engage in idler gear 69 which operates to advance wheel 63 one station for every complete revolution of wheel 62. When desirable these printing wheels may be driven from clock 42, instead of employing a separate clock 65. The method of transferring motion from one printing wheel to the other, so that one wheel advances one step for a complete revolution of the other is well known in the art, and requires no further explanation. Such gears are used extensively in odometers and other recording devices.

The date is impressed upon the record tape by the printing wheels 71—72—73—74, giving the month, day and year respectively. These printing wheels are set to print the proper date by means of the indicating thumb-wheels 75—76—77—78 on the face of the meter, to which the printing wheels are connected by four shafts 79 lying one within the other.

The distance traveled is impressed by means of the odometer printing wheels 81 which are connected with the main driving shaft 27. These printing wheels are always operatively connected with the main driving shaft and register the distance traveled by the vehicle, regardless of the tariff on which the vehicle is chartered. Motion is transferred from the drive shaft 27 to the shaft 82 carrying the odometer printing wheels through a chain gearing, which properly integrates the distance traveled.

A small gear 83 on shaft 27 meshes with gear 84, which turns gear 85 mounted on the same shaft. From gear 85 motion is transferred through gears 86—87—88 and 89 to shaft 82. A Geneva gear 91 is provided between the printing wheels and shaft 82, to advance the printing wheel by steps. As most taximeter charges are calculated to the fifth of a mile, I have arranged the first printing wheel to register fifths, but this arrangement is perfectly arbitrary. These printing wheels are also provided with means for advancing each wheel one step, for a complete revolution of the wheel adjacent.

Figure 7:
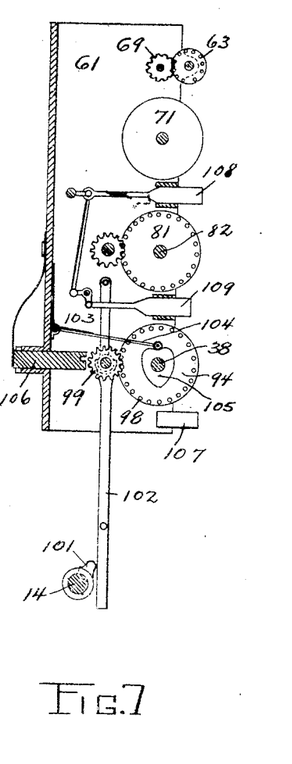
Fig. 7 is a side view of the printing wheels showing the mechanism for resetting the money wheels.

The money charge wheels 92—93—94 are operated from shaft 38 through the gears 95 and 96 and the Geneva gear 97; the wheel 92 being graduated in ten cent divisions and the others in dollar divisions. These printing wheels are also provided with laterally extending pins 98 and gear wheels 99 for advancing each wheel one step for a complete revolution of the wheel adjacent. At the beginning of a trip these printing wheels register zero, so that some provision must be made for returning them to that position after the previous trip has been completed. This is effected by means of a cam 101 on shaft 14 which engages the lever 102 when the tariff wheel is turned to expose "Vacant" on the face of the meter. The lever 102 is pivoted to the frame and at its upper end engages the shaft of gear wheels 99, which is mounted on a swinging frame 103 so that the gear wheels 99 are movable in or out of mesh with the pins 98.

When the gears 99 have been moved out of mesh, the printing wheels are returned to their zero position by means of the spring pressed rod 104 bearing on a heart 105 attached to each printing wheel.

In order to hold the gear wheels 99 in proper position so that they will mesh correctly with the pins 98 when the two are brought into engagement, I provide a spring held slide 106, provided with a slotted end lying adjacent the gears 99. As the gears 99 are moved away from the pins 98, the teeth of the gears engage in the slot and are thereby held against rotation. The slide 106 is arranged in such position that the gears 99 engage in the slot therein before becoming disengaged from the pins 98.

A fixed printing plate 107 bearing the number of the vehicle lies in proper position so that the vehicle number is printed upon the record tape. Provision is also made for impressing on the record tape, the legend "Day" or "Night" to indicate the driver of the vehicle. These legends are mounted on the printing plates 108 and 109, which are moved into or out of printing position by means of the thumb wheel 112 on the face of the meter. This wheel 112 is mounted on shaft 113 which extends through the meter to the printing devices and operates to place either of the printing plates in position.

Figure 8:
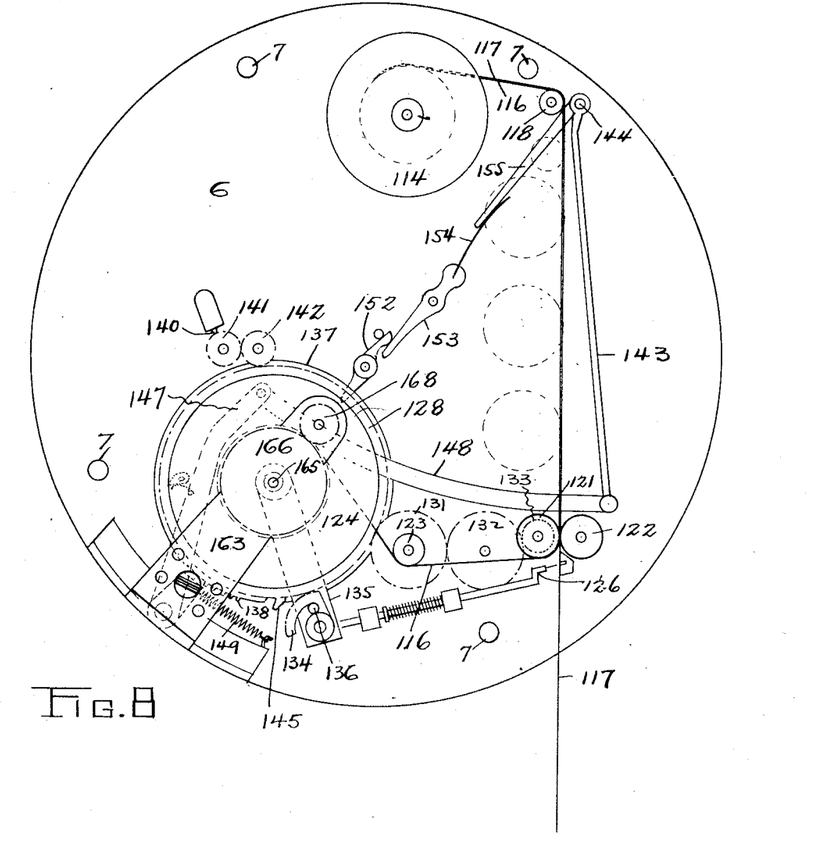
Fig. 8 is a view of the mechanism for feeding the record tapes and for impressing the record of the wheels thereon.

*The tape feeding and stamping mechanism.*—The tape feeding and stamping mechanism is mounted on the back plate 6 of the meter which is positioned by means of the dowel pins 7. The arrangement of the mechanism is such that when the back plate is in position, the record tapes occur in correct position under the printing wheels. The record tapes are arranged in duplicate on the supply reel 114 which is readily removable so that it may be reloaded. This reel is prevented from revolving too rapidly by means of a spring 115 bearing against the lower face thereof. From the supply reel the duplicate tapes 116—117 pass around the idler 118, past the printing wheels and between the feed rollers 121—122. These feed rollers are preferably covered with rubber or some similar substance so that they obtain a firm grip on the tapes. After passing the feed rollers one tape 116 passes over the roller 123 onto the take-up reel 124. The other tape 117 moves downward and projects out of the meter. A spring held knife 126 or other severing instrument is arranged to cut the tape 117 at the proper time, so that the detached ticket bearing the data of the trip may be presented to the passenger. The feed rollers 121—122 are operated from the handle 127 through the gear 128 on the take-up reel shaft, the idlers 131—132 and the gear 133 on the feed roller 121. The handle 127 is moved back and forth in the arc of a circle and means must be provided for causing a movement of the tapes in one direction from this reciprocating motion. This is accomplished by means of the quadrant 134 mounted on the arm 135, which is rigidly connected with the handle 127. The gear 128 which is engaged by the quadrant is loosely mounted on its shaft and revolves only under the action of arm 135 when the quadrant is in locked position. The quadrant is provided with a slot which engages a pin 136 on the arm 135 which holds it locked in one position, and is also provided with a spring which prevents it moving away from the gear 128 so that it may readily mesh therewith. When the handle 127 and therefore the arm 135 is moved from right to left, as shown in Fig. 8, the quadrant will become disengaged from the gear 128 and will not act to advance the tapes. When moved in the opposite direction however, the quadrant is held in mesh by the pin 136 and causes a simultaneous movement of gear 128 and the feed rollers. Provision is made, however, for causing a slight movement of the record tapes, by the movement of the handle as it reaches its extreme left position. This is accomplished by means of the wheel 137 which is rigidly attached to the handle shaft. This wheel 137 is provided with several teeth 138, arranged in such position that they mesh with the pinion 139 as the handle reaches the end of its throw. The movement of pinion 139 is transferred to pinion 141 on the same shaft by means of a pawl and ratchet within the pinions. Pinion 141 meshes with pinion 142 which engages gear 128, thereby causing a slight movement of gear 128 and consequently of the tapes in the proper direction. The pawl and ratchet in the pinions prevents a movement of gear 128 from this source when the handle is moved in the opposite direction. The pinion 139 is prevented from being moved by the frictional engagement of the pawl by means of a spring held finger 140.

The printing of the data on the record strips is accomplished by means of the stamping plate 143 arranged in proper position to lie parallel to the printing surfaces when in the stamping position, but to lie away from these surfaces when not in operation. The plate 143 is pivoted at one end to the shaft 144 arranged on the back plate.

When the passenger enters the vehicle the stamping apparatus is in the position shown in Fig. 8, the handle being moved to the extreme right. The movement of the handle to the left brings the spring held pawl 145 mounted on wheel 137 into engagement with the short arm 146 throwing that arm to the left. This arm is rigidly connected to lever 147 which is connected to the stamping plate by the link 148. The movement of the handle therefore, throws the stamping plate to impress upon the record tapes, the data on the printing wheels at the beginning of the trip. A further movement of the handle to the extreme left brings the pinions 139—141—142 into operation with the effect that after receiving the initial imprint, the tapes are moved a slight distance to present a clean surface below the printing wheels. After stamping the stamping plate is returned to its original position by means of the spring 149.

Figure 9:
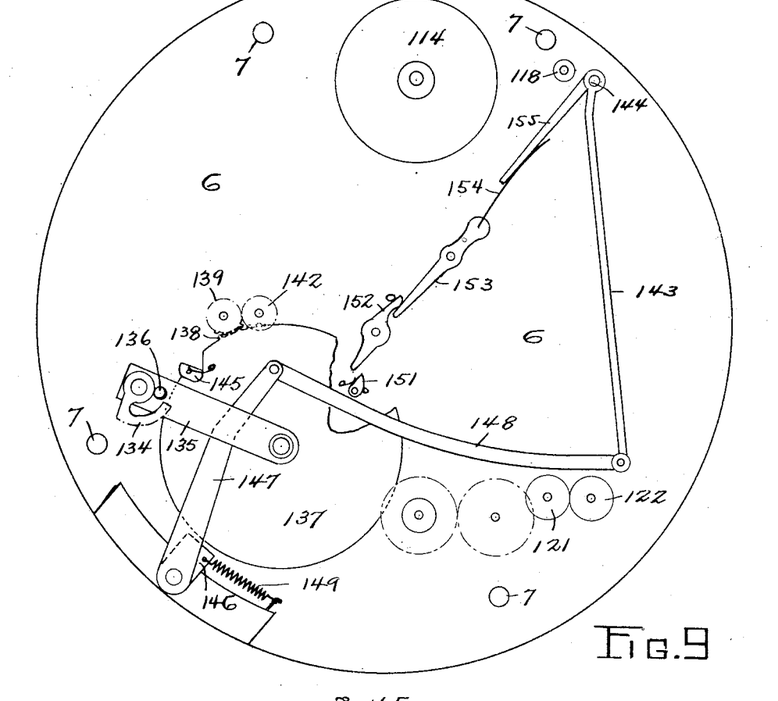
Fig. 9 is a view of the stamping mechanism.
Figure 10:
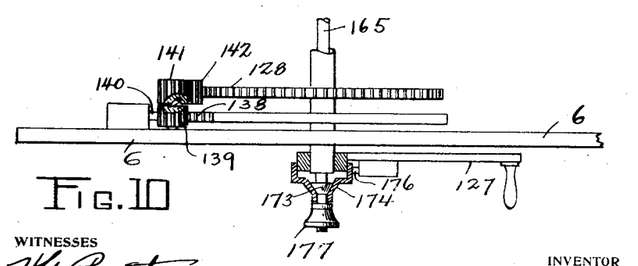
Fig. 10 is a side view of part of the mechanism for feeding the tapes and stamping the record thereon.
Figures 12, 13:
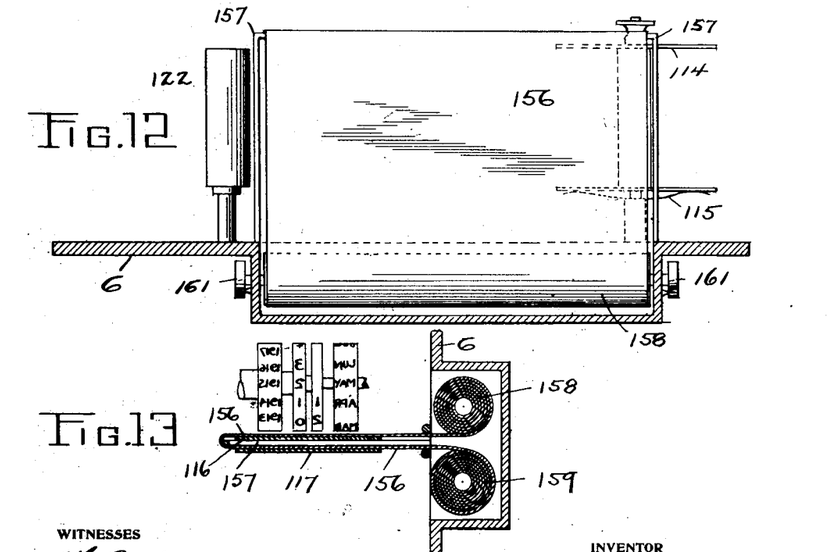
Fig. 12 is a plan of the mechanism for holding the printing ribbon in place adjacent the record tapes.
Fig. 13 is a section through the printing ribbon, showing the relative positions of the printing wheels, the printing ribbon and the record tapes.

At the end of the trip the apparatus is in the position shown in Fig. 9, the handle being at the extreme left. The driver of the vehicle then moves the handle to the right to its original position. The first movement of the handle to the right, brings the spring held pawl 151, mounted on wheel 137 into engagement with the lever 152 pivotally mounted on the back plate. The motion of lever 152 is transferred to the stamping plate through lever 153 which is provided with a spring 154 bearing against an arm 155 attached to the stamping plate. The initial movement of the handle to the left therefore, imprints upon the record tapes the data shown on the printing wheels at the end of the trip. A further movement of the handle brings the quadrant 134 into locked engagement with gear 128 and revolves said gear to feed the tape the proper distance so that all the data thereon will lie below the point of cutting. At the extreme right the arm 135 engages the knife and severs the tape 117 so that the record ticket may be presented to the passenger. The record is made upon the record tapes by means of an inked ribbon 156, such as is used in typewriters, which lies under the printing wheels and over the record tapes. The ribbon 156 passes over the wire frame 157 and is accumulated on the rolls 158—159, mounted on the back plate. As the ribbon becomes used, it may be shifted by means of the thumb screws 161 attached to the rolls and lying on the outside of the meter. As the record strips are advanced by the feed rollers 121—122 and the diameter of the roll on the take-up reel varies with the amount of strip thereon, some provisions must be made for keeping the strip 116 taut on the reel regardless of the amount of strip already accumulated. This is accomplished by placing a coiled spring between the reel and the handle which acts to overcome these variations. Provision is also made for causing the reel to turn in one direction, although the handle is reciprocated.

Figure 11:
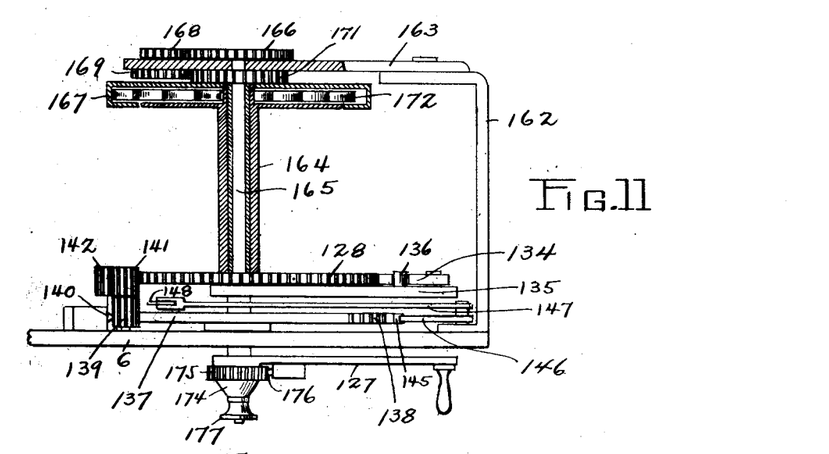
Fig. 11 is a view partly in section of the take up reel for the record strip.

The reel is mounted in a bracket 162, the upper arm 163 of which is readily removable, so that the reel can be removed and the accumulated record strip removed. The winding element or spindle 164 of the reel is revolved by the handle through shaft 165. This shaft is provided on its upper end with a gear 166 which transfers the motion of the shaft to the upper flange 167 of the reel through gears 168—169 and 171; gear 171 being fixed on the flange 167. The spindle 164 of the reel is separate from the flange 167 and is connected thereto by means of a coiled spring 172 lying within the flange. The effect, therefore, of moving the handle is to put this spring 172 into tension and thereby revolve the spindle. Should the movement of the flange be greatly in excess of the movement of the spindle, on account of the record strip, and the spring become tightly coiled, the handle may still be moved to operate the feeding and stamping mechanism without operating the reel. This is effected by means of a friction connection between the handle and the shaft 165. This frictional connection consists of a cone 173 mounted on shaft 165 and which is engaged by a complementary member 174, which engages the handle. The member 174 is provided on its face with a ratchet 175 engaged by a pawl 176 on the handle, so that as the handle is reciprocated, the shaft 165 is turned in one direction only. A thumb nut 177 on shaft 165 is used to vary the degree of friction between the cone 173 and its complementary member.

I claim:

1. A taximeter adapted to be attached to a vehicle provided with means for registering the cost of the trip according to a given schedule in combination with an actuator movable from an initial point through a cycle of operations to its starting point, and means operative during such movement to imprint upon record tapes two readings of the meter, one at the beginning and the other at the end of the trip the readings being printed on the tape in close relation to each other.

2. In a taximeter adapted to be attached to a vehicle, registering devices adapted to indicate the cost of the trip, a tape feeding mechanism adapted to feed duplicate tapes into printing position with said registering devices, an actuator movable from an initial point through a cycle of operations to its starting point, and means operative during such movement for causing the registering devices to print data upon the tape at the beginning of the trip, and other data thereon at the end of the trip and means for slightly moving the tapes between said printing operations.

3. In a taximeter of the class described a stamping mechanism comprising a hinged plate and means for operating said plate comprising a wheel adapted to be reciprocated having spring held pawls thereon adapted to engage levers connected to opposite ends of the plate, to cause a movement of the plate for opposite directions of movement of the wheel.

4. In a taximeter adapted to be attached to a vehicle, and to register the cost of the trip, a plurality of integrating means corresponding to different time and distance and to independent time schedules and means for throwing any one of said integrating means into operation and indicating on the face of the meter which schedule is in operation.

5. In a taximeter adapted to be operated at different schedules, a plurality of integrating means corresponding with such schedules, each integrating means comprising a train of gears mounted on a pivoted arm, said gears being normally held out of mesh with the driving and registering mechanism, and means comprising a plurality of cams for setting either integrating means into mesh with the driving and registering mechanism.

6. In a taximeter, a registering mechanism, means for holding a plurality of tapes in close relation thereto, a printing mechanism, a handle, means operative by the movement of the handle in one direction to operate the printing mechanism and advance the tapes a slight distance, and means operative by the return movement of handle to operate the printing mechanism and move the printed section of the tapes from printing position.

7. In a taximeter, a registering mechanism, means for holding two tapes in close relation thereto, a printing mechanism, a handle, means operative by the movement of the handle in one direction to operate the printing mechanism and advance the tape a slight distance, means operative by the reverse movement of the handle for operating the printing mechanism and feeding one of said tapes out of the meter and for severing said tape beyond the printed portion and a take up reel upon which the other tape is wound.

8. In a taximeter, a registering mechanism, means for holding a tape in close relation thereto, a printing mechanism, a handle, means operative by the initial movement of the handle in one direction to operate the printing mechanism and by the final movement of the handle in the same direction to advance the tape a slight distance, and means operated by the initial movement of the handle in the reverse direction to operate the printing mechanism, by a further movement of the handle to feed the tape out of the meter and by the final movement of handle to sever the printed portion from the tape.

9. A taximeter, provided with means for registering the cost of a trip at a given rate per hour and the elapsed time in combination with means for imprinting said data upon a tape.

10. A tape feeding device adapted to be operated by the reciprocation of a handle, comprising a handle and means for advancing the tape a slight distance by the final movement of the handle in one direction, for holding the tape stationary during the beginning of the movement in the opposite direction and for advancing the tape for a continuation of said movement.

WALTER LEWIN.

Witnesses:
E. A. MORCK,
A. B. DOLLAR.